United States Patent
Riddle et al.

(10) Patent No.: US 6,412,000 B1
(45) Date of Patent: Jun. 25, 2002

(54) METHOD FOR AUTOMATICALLY CLASSIFYING TRAFFIC IN A PACKET COMMUNICATIONS NETWORK

(75) Inventors: Guy Riddle; Robert L. Packer, both of Los Gatos, CA (US)

(73) Assignee: Packeteer, Inc., Cupertino, CA (US)

( * ) Notice: Subject to any disclaimer, the term of this patent is extended or adjusted under 35 U.S.C. 154(b) by 0 days.

(21) Appl. No.: 09/198,090

(22) Filed: Nov. 23, 1998

Related U.S. Application Data

(60) Provisional application No. 60/066,864, filed on Nov. 25, 1997.

(51) Int. Cl.[7] ............................................. G06F 15/173
(52) U.S. Cl. ...................... 709/224; 709/223; 709/230; 709/238; 709/242; 370/230; 370/235; 370/252; 370/355; 370/356
(58) Field of Search .................................. 709/223–226, 709/230, 235–236, 238–239, 242, 246; 370/229–230, 235, 252–253, 355–356, 401, 466–469

(56) References Cited

U.S. PATENT DOCUMENTS

| | | | | | |
|---|---|---|---|---|---|
| 5,251,152 A | * | 10/1993 | Notess | ...................... | 709/224 |
| 5,495,426 A | * | 2/1996 | Waclawsky et al. | ........ | 709/226 |
| 5,838,919 A | * | 11/1998 | Schwaller et al. | .......... | 709/224 |
| 5,870,561 A | * | 2/1999 | Jarvis et al. | ................ | 709/238 |
| 5,903,559 A | * | 5/1999 | Acharya et al. | ............ | 709/236 |
| 5,923,849 A | * | 7/1999 | Venkatraman | .............. | 709/224 |
| 6,028,842 A | * | 2/2000 | Chapman et al. | ........... | 370/252 |
| 6,046,980 A | * | 4/2000 | Packer | ....................... | 370/230 |
| 6,137,782 A | * | 10/2000 | Sharon et al. | ............. | 709/238 |
| 6,209,033 B1 | * | 3/2001 | Datta et al. | ................. | 709/224 |

* cited by examiner

Primary Examiner—Zarni Maung
Assistant Examiner—Bharat Barot
(74) Attorney, Agent, or Firm—Townsend and Townsend and Crew LLP; Kenneth R. Allen

(57) ABSTRACT

In a packet communication environment, a method is provided for automatically classifying packet flows for use in allocating bandwidth resources by a rule of assignment of a service level. The method comprises applying individual instances of traffic classification paradigms to packet network flows based on selectable information obtained from a plurality of layers of a multi-layered communication protocol in order to define a characteristic class, then mapping the flow to the defined traffic class. It is useful to note that the automatic classification is sufficiently robust to classify a complete enumeration of the possible traffic.

15 Claims, 7 Drawing Sheets

LEGEND
88  Session/Application Layer
86  Transport Layer
84  Network Layer
82  Data Link Layer
80  Physical Layer

METHOD FOR AUTOMATICALLY CLASSIFYING TRAFFIC IN A PACKET COMMUNICATIONS NETWORK

CROSS-REFERENCES TO RELATED APPLICATIONS

This application claims priority from a commonly owned U.S. Provisional Patent Application, Ser. No. 60/066,864, filed on Nov. 25 1997, in the name of Guy Riddle and Robert L. Packer, entitled "Method for Automatically Classifying Traffic in a Policy Based Bandwidth Allocation System."

The following related commonly-owned contemporaneously-filed co-pending U.S. Patent Application is hereby incorporated by reference in its entirety for all purposes: U.S. patent application Ser. No. 09/198,051, still pending, in the name of Guy Riddle, entitled "Method for Automatically Determining a Traffic Policy in a Packet Communications Network,".

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Further, this application makes reference to the following commonly owned U.S. Patent Application, which are incorporated by reference herein in their entirety for all purposes:

U.S. Pat. No. 5,802,106, in the name of Robert L. Packer, entitled "Method for Rapid Data Rate Detection in a Packet Communication Environment Without Data Rate Supervision," relates to a technique for automatically determining the data rate of a TCP connection;

U.S. patent application Ser. No. 08/977,376, now U.S. Pat. No. 6,046,980, in the name of Robert L. Packer, entitled "Method for Managing Flow Bandwidth Utilization at Network, Transport and Application Layers in Store and Forward Network," relates to a technique for automatically allocating bandwidth based upon data rates of TCP connections according to a hierarchical classification paradigm; and.

U.S. patent application Ser. No. 08/742,994, now U.S. Pat. No. 6,038,216 in the name of Robert L. Packer, entitled "Method for Explicit Data Rate Control in a Packet Communication Environment Without a Data Rate Supervision," relates to a technique for automatically scheduling TCP packets for transmission.

BACKGROUND OF THE INVENTION

This invention relates to digital packet telecommunications, and particularly to management of network bandwidth based on information ascertainable from multiple layers of OSI network model. It is particularly useful in conjunction with bandwidth allocation mechanisms employing traffic classification in a digitally-switched packet telecommunications environment, as well as in monitoriing, security and routing.

The ubiquitous TCP/IP protocol suite, which implements the world-wide data communication network environment called the Internet and is also used in private networks (Intranets), intentionally omits explicit supervisory function over the rate of data transport over the various media which comprise the network. While there are certain perceived advantages, this characteristic has the consequence of juxtaposing very high-speed packet flows and very low-speed packet flows in potential conflict for network resources, which results in inefficiencies. Certain pathological loading conditions can result in instability, overloading and data transfer stoppage. Therefore, it is desirable to provide some mechanism to optimize efficiency of data transfer while minimizing the risk of data loss. Early indication of the rate of data flow which can or must be supported is imperative. In fact, data flow rate capacity information is a key factor for use in resource allocation decisions. For example, if a particular path is inadequate to accommodate a high rate of data flow, an alternative route can be sought out.

Internet/Intranet technology is based largely on the TCP/IP protocol suite, where IP, or Internet Protocol, is the network layer protocol and TCP, or Transmission Control Protocol, is the transport layer protocol. At the network level, IP provides a "datagram"delivery service. By contrast, TCP builds a transport level service over the datagram service to provide guaranteed, sequential delivery of a byte stream between two IP hosts.

TCP flow control mechanisms operate exclusively at the end stations to limit the rate at which TCP endpoints emit data. However, TCP lacks explicit data rate control. The basic flow control mechanism is a sliding window, superimposed on a range of bytes beyond the last explicitly-acknowledged byte. Its sliding operation limits the amount of unacknowledged transmissible data that a TCP endpoint can emit.

Another flow control mechanism is a congestion window, which is a refinement of the sliding window scheme, which employs conservative expansion to fully utilize all of the allowable window. A component of this mechanism is sometimes referred to as "slow start".

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is retransmitted.

Data rate flow control mechanisms which are operative end-to-end without explicit data rate control draw a strong inference of congestion from packet loss (inferred, typically, by RTO). TCP end systems, for example, will "back-off", i.e., inhibit transmission in increasing multiples of the base RTT average as a reaction to consecutive packet loss.

Bandwidth Management in TCP/IP Networks

Conventional bandwidth management in TCP/IP networks is accomplished by a combination of TCP end systems and routers which queue packets and discard packets when certain congestion thresholds are exceeded. The discarded, and therefore unacknowledged, packet serves as a feedback mechanism to the TCP transmitter. (TCP end systems are clients or servers running the TCP transport protocol, typically as part of their operating system.) The term "bandwidth management" is often used to refer to link level bandwidth management, e.g. multiple line support for Point to Point Protocol (PPP). Link level bandwidth management is essentially the process of keeping track of all traffic and deciding whether an additional dial line or ISDN channel should be opened or an extraneous one closed. The field of this invention is concerned with network level bandwidth management, i.e. policies to assign available bandwidth from a single logical link to network flows.

In a copending U.S. patent application Ser. No. 08/742,994, now U.S. Pat. No. 6,038,216, in the name of Robert L. Packer, entitled "Method for Explicit Data Rate Control in a Packet Communication Environment Without Data Rate Supervision," a technique for automatically scheduling TCP packets for transmission is disclosed. Furthermore, in U.S. Pat. No. 5,802,106, in the name of Robert L. Packer, entitled "Method for Rapid Data Rate Detection in a Packet Communication Environment Without Data Rate Supervision," a technique for automatically determining the data rate of a TCP connection is disclosed. Finally, in a copending U.S. Pat. application Ser. No. 08/977,376, now abandoned, in the name of Robert L. Packer, entitled "Method for Managing Flow Bandwidth Utilization at Network, Transport and Application Layers in Store and Forward Network," a technique for automatically allocating bandwidth based upon data rates of TCP connections according to a hierarchical classification paradigm is disclosed.

Automated tools assist the network manager in configuring and managing the network equipped with the rate control techniques described in these copending applications. In a related copending application, a tool is described which enables a network manager to automatically produce policies for traffic being automatically detected in a network. It is described in a copending U.S. patent application Ser. No. 09/198,051, still pending, in the name of Guy Riddle, entitled "Method for Automatically Determining a Traffic Policy in a Packet Communications Network", based on U.S. Provisional Patent Application Ser. No. 60/066,864. The subject of the present invention is also a tool designed to assist the network manager.

While these efforts teach methods for solving problems associated with scheduling transmissions, automatically determining data flow rate on a TCP connection, allocating bandwidth based upon a classification of network traffic and automatically determining a policy, respectively, there is no teaching in the prior art of methods for automatically classifying packet traffic based upon information gathered from a multiple layers in a multi-layer protocol network.

Bandwidth has become the expensive commodity of the '90s, as traffic expands faster than resources, the need to "prioritize" a scarce resource, becomes ever more critical. One way to solve this is by applying "policies" to control traffic classified as to type of service required in order to more efficiently match resources with traffic.

Traffic may be classified by type, e.g. E-mail, web surfing, file transfer, at various levels. For example, to classify by network paradigm, examining messages for an IEEE source/destination service access point (SAP) or a sub-layer access protocol (SNAP) yields a very broad indicator, i.e., SNA or IP. More specific types exist, such as whether an IP protocol field in an IP header indicates TCP or UDP. Well known connection ports provide indications at the application layer, i.e., SMTP or HTTP.

Classification is not new. Firewall products like "CheckPoint FireWall-1," a product of CheckPoint Software Technologies, Inc., a company with headquarters in Redwood City, Calif., have rules for matching traffic. Bandwidth managers such as "Aponet," a product of Aponet, Inc., a company with headquarters in San Jose, Calif., classify by destination. The PacketShaper, a product of Packeteer, Inc., a company with headquarters in Cupertino, Calif., allows a user to manually enter rules to match various traffic types for statistical tracking, i.e., counting by transaction, byte count, rates, etc. However, manual rule entry requires a level of expertise that limits the appeal for such a system to network savvy customers. What is really needed is a method for analyzing real traffic in a customer's network and automatically producing a list of the "found traffic."

SUMMARY OF THE INVENTION

According to the invention, in a packet communication environment, a method is provided for automatically classifying packet flows for use in allocating bandwidth resources and the like by a rule of assignment of a service level. The method comprises applying individual instances of traffic classification paradigms to packet network flows based on selectable information obtained from a plurality of layers of a multi-layered communication protocol in order to define a characteristic class, then mapping the flow to the defined traffic class. It is useful to note that the automatic classification is sufficiently robust to classify a complete enumeration of the possible traffic.

In the present invention network managers need not know the technical aspects of each kind of traffic in order to configure traffic classes and service aggregates bundle traffic to provide a convenience to the user, by clarifying processing and enables the user to obtain group counts of all parts comprising a service.

The invention will be better understood upon reference to the following detailed description in connection with the accompanying drawings.

DESCRIPTION OF SPECIFIC EMBODIMENTS

1.0 Introduction

Figure 1A:
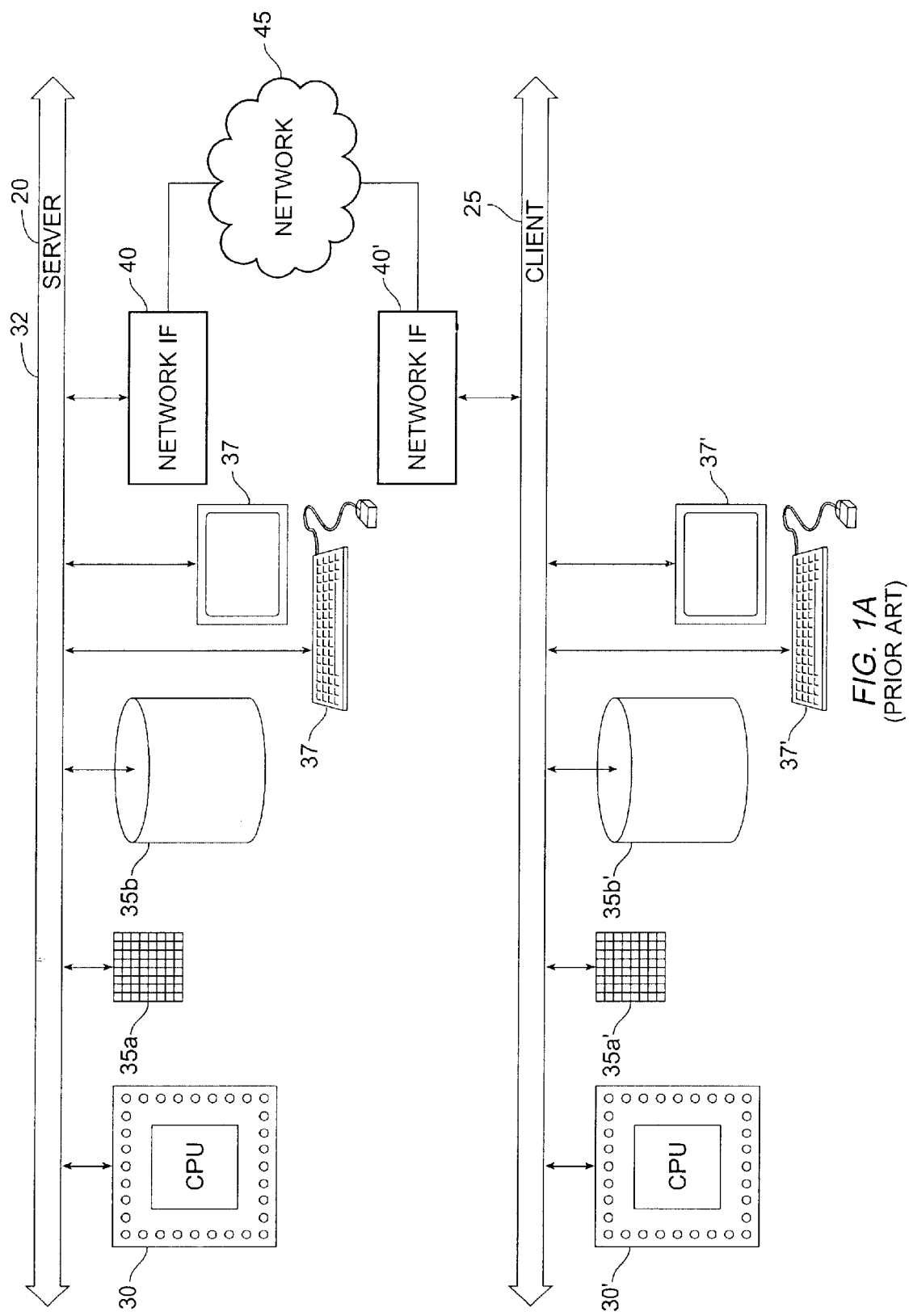
FIG. 1A depicts a representative client server relationship in accordance with a particular embodiment of the invention.

The present invention provides techniques to automatically classify a plurality of heterogeneous packets in a packet telecommunications system for management of network bandwidth in systems such as a private area network, a wide area network or an internetwork. Systems according to the present invention enable network managers to: automatically define traffic classes, for which policies may then be created for specifying service levels for the traffic classes and isolating bandwidth resources associated with certain traffic classes. Inbound as well as outbound traffic may be managed. Table 1 provides a definitional list of terminology used herein.

TABLE 1

LIST OF DEFINITIONAL TERMS

| Term | Definition |
|---|---|
| ADMISSIONS CONTROL | A policy invoked whenever a system according to the invention detects that a guaranteed information rate cannot be maintained. An admissions control policy is analogous to a busy signal in the telephone world. |
| CLASS SEARCH ORDER | A search method based upon traversal of a N-ary tree data structure containing classes. |
| COMMITTED INFORMATION RATE(CIR) | A rate of data flow allocated to reserved service traffic for rate based bandwidth allocation for a committed bandwidth. Also called a guaranteed information rate (GIR). |
| EXCEPTION | A class of traffic provided by the user which supersedes an automatically determined classification order. |
| EXCESS INFORMATION RATE(EIR) | A rate of data flow allocated to reserved service traffic for rate based bandwidth allocation for uncommitted bandwidth resources. |
| FLOW | A flow is a single instance of a traffic class. For example, all packets in a TCP connection belong to the same flow. As do all packets in a UDP session. |
| GUARANTEED INFORMATION RATE (GIR) | A rate of data flow allocated to reserved service traffic for rate based bandwidth allocation for a committed bandwidth. Also called a committed information rate (CIR). |
| INSIDE | On the system side of an access link. Outside clients and servers are on the other side of the access link. |
| ISOLATION | Isolation is the degree that bandwidth resources are allocable to traffic classes. |
| OUTSIDE | On the opposite side of an access link as viewed from the perspective of the system on which the software resides. |
| PARTITION | Partition is an arbitrary unit of network resources. |
| POLICY | A rule for the assignment of a service level to a flow. |
| POLICY INHERITANCE | A method for assigning policies to flows for which no policy exists in a hierarchical arrangement of policies. For example, if a flow is determined to be comprised of FTP packets for Host A, and no corresponding policy exists, a policy associated with a parent node, such as an FTP policy, may be located and used. |
| POLICY BASED SCALING | An adjustment of a requested data rate for a particular flow based upon the policy associated with the flow and information about the flow's potential rate. |
| SCALED RATE | Assignment of a data rate based upon detected speed. |
| SERVICE LEVEL | A service paradigm having a combination of characteristics defined by a network manager to handle a particular class of traffic. Service levels may be designated as either reserved or unreserved. |
| TRAFFIC CLASS | All traffic between a client and a server endpoints. A single instance of a traffic class is called a flow. Traffic classes have properties or class attributes such as, directionality, which is the property of traffic to be flowing inbound or outbound; |
| UNRESERVED SERVICE | Unreserved service is a service level defined in terms of priority in which no reservation of bandwidth is made. |
| URI | A Universal Resource Identifier is the name of the location field in a web reference address. It is also called a URL or Universal Resource Locator |

1.1 Hardware Overview

The method for automatically classifying heterogeneous packets in a packet telecommunications environment of the present invention is implemented in the C programming language and is operational on a computer system such as shown in FIG. 1A. This invention may be implemented in a client-server environment, but a client-server environment is not essential. This figure shows a conventional client-server computer system which includes a server 20 and numerous clients, one of which is shown as client 25. The use of the term "server" is used in the context of the invention, wherein the server receives queries from (typically remote) clients, does substantially all the processing necessary to formulate responses to the queries, and provides these responses to the clients. However, server 20 may itself act in the capacity of a client when it accesses remote databases located at another node acting as a database server.

The hardware configurations are in general standard and will be described only briefly. In accordance with known practice, server 20 includes one or more processors 30 which communicate with a number of peripheral devices via a bus subsystem 32. These peripheral devices typically include a storage subsystem 35, comprised of a memory subsystem 35a and a file storage subsystem 35b holding computer programs (e.g., code or instructions) and data, a set of user interface input and output devices 37, and an interface to outside networks, which may employ Ethernet, Token Ring, ATM, IEEE 802.3, ITU X.25, Serial Link Internet Protocol (SLIP) or the public switched telephone network. This interface is shown schematically as a "Network Interface" block 40. It is coupled to corresponding interface devices in client computers via a network connection 45.

Client 25 has the same general configuration, although typically with less storage and processing capability. Thus, while the client computer could be a terminal or a low-end personal computer, the server computer is generally a high-end workstation or mainframe, such as a SUN SPARC server. Corresponding elements and subsystems in the client computer are shown with corresponding, but primed, reference numerals.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using interface devices 37' (or devices 37 in a standalone system). For example, client queries are entered via a keyboard, communicated to client processor 30', and thence to modem or network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

Figure 1B:
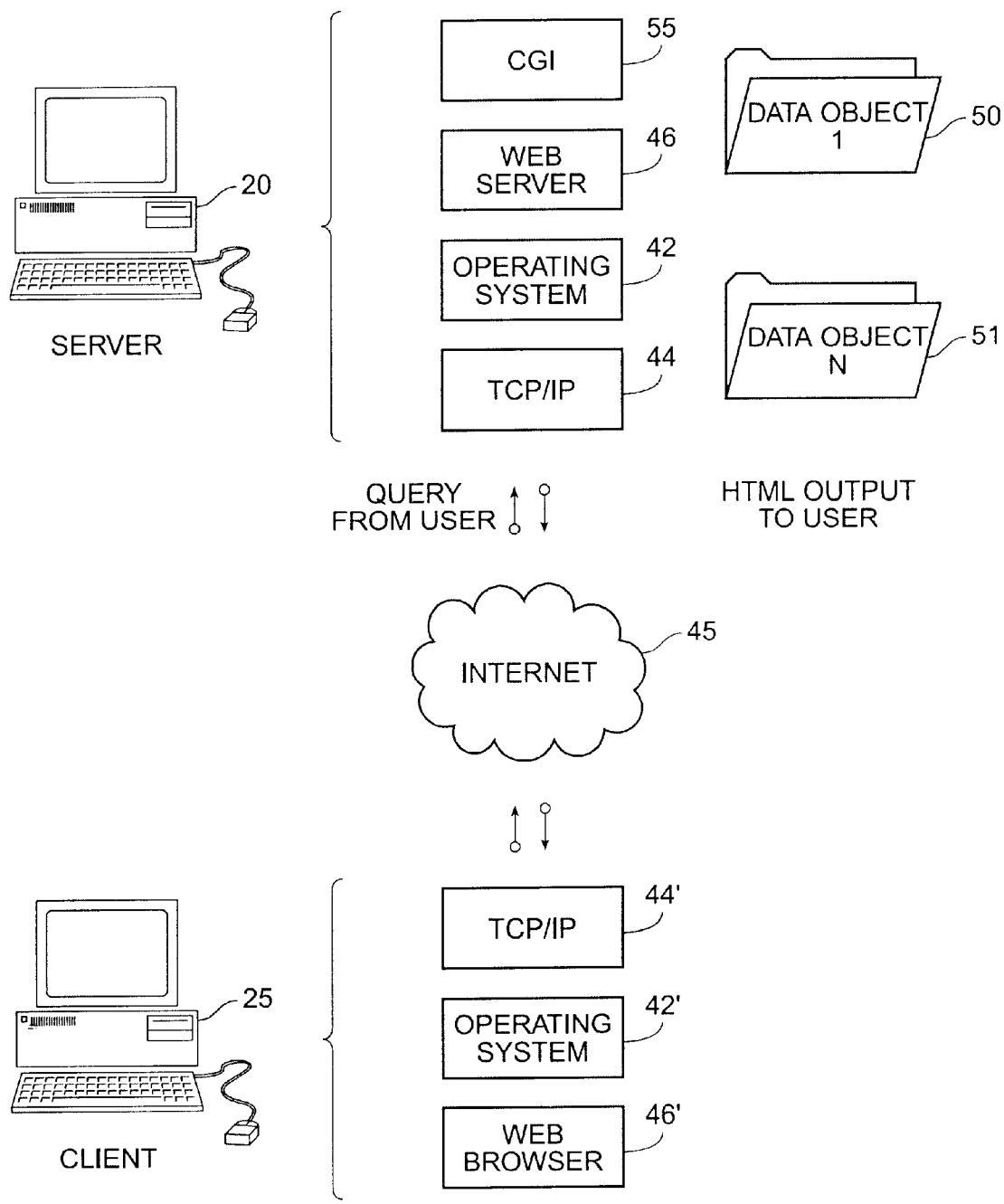
FIG. 1B depicts a functional perspective of the representative client server relationship in accordance with a particular embodiment of the invention.

FIG. 1B is a functional diagram of a computer system such as that of FIG. 1A. FIG. 1B depicts a server 20, and a representative client 25 of a plurality of clients which may interact with the server 20 via the Internet 45 or any other communications method. Blocks to the right of the server are indicative of the processing steps and functions which occur in the server's program and data storage indicated by blocks 35a and 35b in FIG. 1A. A TCP/IP "stack" 44 works in conjunction with Operating System 42 to communicate with processes over a network or serial connection attaching Server 20 to Internet 45. Web server software 46 executes concurrently and cooperatively with other processes in server 20 to make data objects 50 and 51 available to requesting clients. A Common Gateway Interface (CGI) script 55 enables information from user clients to be acted upon by web server 46, or other processes within server 20. Responses to client queries may be returned to the clients in the form of a Hypertext Markup Language (HTML) document outputs which are then communicated via Internet 45 back to the user.

Client 25 in FIG. 1B possesses software implementing functional processes operatively disposed in its program and data storage as indicated by block 35a' in FIG. 1A. TCP/IP stack 44', works in conjunction with Operating System 42' to communicate with processes over a network or serial connection attaching Client 25 to Internet 45. Software implementing the function of a web browser 46' executes concurrently and cooperatively with other processes in client 25 to make requests of server 20 for data objects 50 and 51. The user of the client may interact via the web browser 46' to make such queries of the server 20 via Internet 45 and to view responses from the server 20 via Internet 45 on the web browser 46'.

Network Overview

Figure 1C:
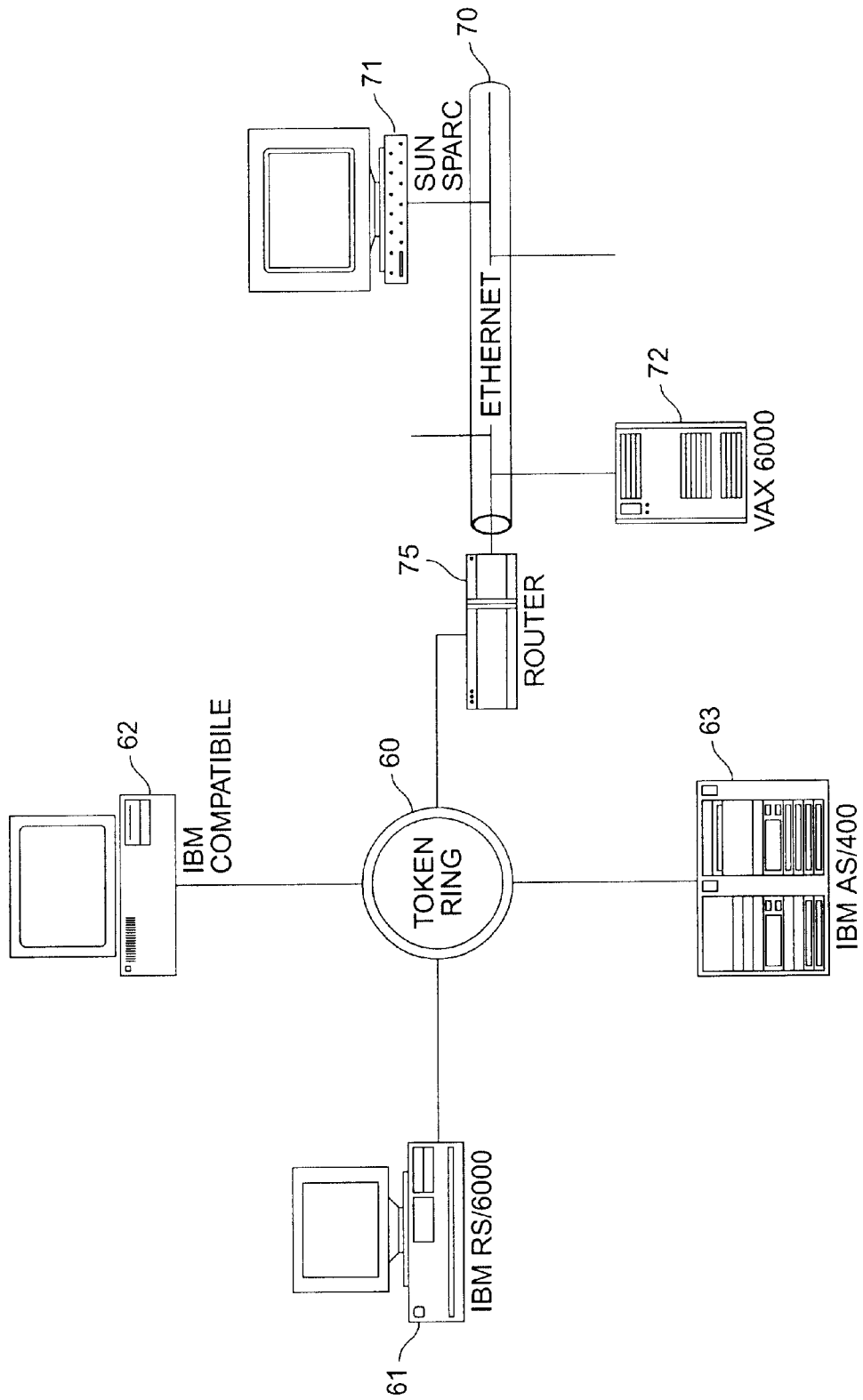
FIG. 1C depicts a representative internetworking environment in accordance with a particular embodiment of the invention.

FIG. 1C is illustrative of the internetworking of a plurality of clients such as client 25 of FIGS. 1A and 1B and a plurality of servers such as server 20 of FIGS. 1A and 1B as described herein above. In FIG. 1C, network 60 is an example of a Token Ring or frame oriented network. Network 60 links host 61, such as an IBM RS6000 RISC workstation, which may be running the AIX operating system, to host 62, which is a personal computer, which may be running Windows 95, IBM OS/2 or a DOS operating system, and host 63, which may be an IBM AS/400 computer, which may be running the OS/400 operating system. Network 60 is internetworked to network 70 via a system gateway which is depicted here as router 75, but which may also be a gateway having a firewall or a network bridge. Network 70 is an example of an Ethernet network that interconnects host 71, which is a SPARC workstation, which may be running SUNOS operating system with host 72, which may be a Digital Equipment VAX6000 computer which may be running the VMS operating system.

Router 75 is a network access point (NAP) of network 70 and network 60. Router 75 employs a Token Ring adapter and Ethernet adapter. This enables router 75 to interface with the two heterogeneous networks. Router 75 is also aware of the Inter-network Protocols, such as ICMP and RIP, which are described herein below.

Figure 1D:
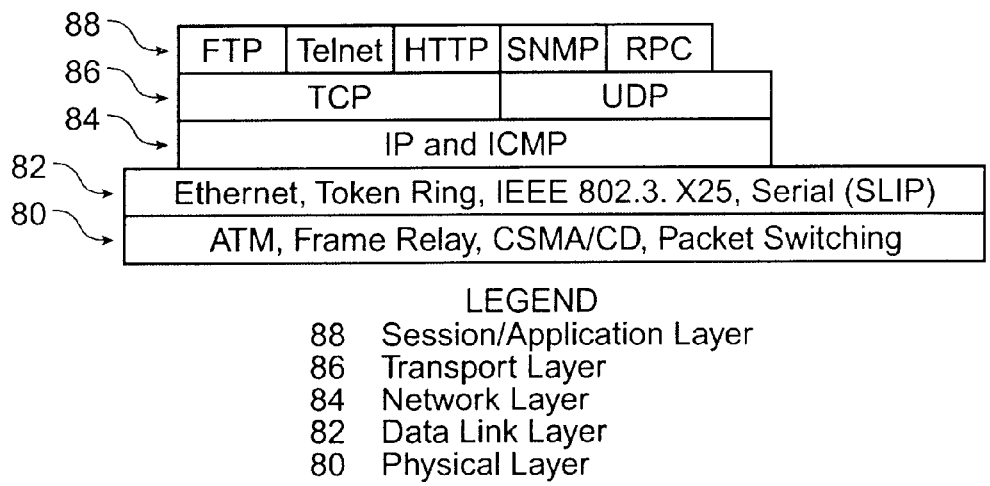
FIG. 1D depicts a relationship diagram of the layers of the TCP/IP protocol suite.

FIG. 1D is illustrative of the constituents of the Transmission Control Protocol/Internet Protocol (TCP/IP) protocol suite. The base layer of the TCP/IP protocol suite is the physical layer 80, which defines the mechanical, electrical, functional and procedural standards for the physical transmission of data over communications media, such as, for example, the network connection 45 of FIG. 1A. The physical layer may comprise electrical, mechanical or functional standards such as whether a network is packet switching or frame-switching; or whether a network is based on a Carrier Sense Multiple Access/Collision Detection (CSMA/CD) or a frame relay paradigm.

Overlying the physical layer is the data link layer 82. The data link layer provides the function and protocols to transfer data between network resources and to detect errors that may occur at the physical layer. Operating modes at the datalink layer comprise such standardized network topologies as IEEE 802.3 Ethernet, IEEE 802.5 Token Ring, ITU X.25, or serial (SLIP) protocols.

Network layer protocols 84 overlay the datalink layer and provide the means for establishing connections between networks. The standards of network layer protocols provide operational control procedures for internetworking communications and routing information through multiple heterogenous networks. Examples of network layer protocols are the Internet Protocol (IP) and the Internet Control Message Protocol (ICMP). The Address Resolution Protocol (ARP) is used to correlate an Internet address and a Media Access Address (MAC) for a particular host. The Routing Information Protocol (RIP) is a dynamic routing protocol for passing routing information between hosts on networks. The Internet Control Message Protocol (ICMP) is an internal protocol for passing control messages between hosts on various networks. ICMP messages provide feedback about events in the network environment or can help determine if a path exists to a particular host in the network environment. The latter is called a "Ping". The Internet Protocol (IP) provides the basic mechanism for routing packets of information in the Internet. IP is a non-reliable communication protocol. It provides a "best efforts" delivery service and does not commit network resources to a particular transaction, nor does it perform retransmissions or give acknowledgments.

The transport layer protocols 86 provide end-to-end transport services across multiple heterogenous networks. The User Datagram Protocol (UDP) provides a connectionless, datagram oriented service which provides a non-reliable delivery mechanism for streams of information. The Transmission Control Protocol (TCP) provides a reliable session-based service for delivery of sequenced packets of information across the Internet. TCP provides a connection oriented reliable mechanism for information delivery.

The session, or application layer 88 provides a list of network applications and utilities, a few of which are illustrated here. For example, File Transfer Protocol (FTP) is a standard TCP/IP protocol for transferring files from one machine to another. FTP clients establish sessions through TCP connections with FTP servers in order to obtain files. Telnet is a standard TCP/IP protocol for remote terminal connection. A Telnet client acts as a terminal emulator and establishes a connection using TCP as the transport mechanism with a Telnet server. The Simple Network Management Protocol (SNMP) is a standard for managing TCP/IP networks. SNMP tasks, called "agents", monitor network status parameters and transmit these status parameters to SNMP tasks called "managers." Managers track the status of associated networks. A Remote Procedure Call (RPC) is a programming interface which enables programs to invoke remote functions on server machines. The Hypertext Transfer Protocol (HTTP) facilitates the transfer of data objects across networks via a system of uniform resource indicators (URI).

The Hypertext Transfer Protocol is a simple protocol built on top of Transmission Control Protocol (TCP). It is the mechanism which underlies the function of the World Wide Web. The HTTP provides a method for users to obtain data objects from various hosts acting as servers on the Internet.

2.0 Traffic Class

A traffic class is broadly defined as traffic between one or more clients and one or more servers. A single instance of a traffic class is called a flow. Traffic classes have the property, or class attribute, of being directional, i.e. all traffic flowing inbound will belong to different traffic classes and be managed separately from traffic flowing outbound. The directional property enables asymmetric classification and control of traffic, i.e., inbound and outbound flows belong to different classes which may be managed independent of one another.

Traffic classes may be defined at any level of the IP protocol as well as for other non-IP protocols. For example, at the IP level, traffic may be defined as only those flows between a specificed set of inside and outside IP addresses or domain names. An example of such a low level traffic class definition would be all traffic between my network and other corporate offices throughout the Internet. At the application level, traffic classes may be defined for specific URIs within a web server. Traffic classes may be defined having "Web aware" class attributes. For example, a traffic class could be created such as all URIs matching "*.html" for all servers, or all URI patterns matching "*.gif" for server X, or for access to server Y with URI pattern "/sales/*" from client Z, wherein '*' is a wildcard character, i.e., a character which matches all other character combinations. Traffic class attributes left unspecified will simply match any value for that attribute. For example, a traffic class that accesses data objects within a certain directory path of a web server is specified by a URI pattern of the directory path to be managed, e.g. "/sales/*" .

2.1 Classifying Traffic

The present invention provides a method for classifying traffic according to a definable set of classification attributes selectable by the manager, including selecting a subset of traffic of interest to be classified. The invention provides the ability to classify and search traffic based upon multiple orthogonal classification attributes.

Traffic class membership may be hierarchical. Thus, a flow may be classified by a series of steps through a traffic class tree, with the last step (i.e., at the leaves on the classification tree) mapping the flow to a policy. The policy is a rule of assignment for flows. Web traffic may also be classified by HTTP header types such as Content-Type (MIME type) or User-Agent.

A classification tree is a data structure representing the hierarchical aspect of traffic class relationships. Each node of the classification tree represents a class, and has a traffic specification, i.e., a set of attributes or characteristics describing the traffic associated with it. Leaf nodes of the classification tree may contain policies. According to a particular embodiment, the classification process checks at each level if the flow being classified matches the attributes of a given traffic class. If it does, processing continues down to the links associated with that node in the tree. If it does not, the class at the level that matches determines the policy for the flow being classified. If no policy specific match is found, the flow is assigned the default policy.

In a preferred embodiment, the classification tree is an N-ary tree with its nodes ordered by specificity. For example, in classifying a particular flow in a classification tree ordered first by organizational departments, the attributes of the flow are compared with the traffic specification in each successive department node and if no match is found, then processing proceeds to the next subsequent department node. If no match is found, then the final compare is a default "match all" category. If, however, a match is found, then classification moves to the children of this department node. The child nodes may be ordered by an orthogonal paradigm such as, for example, "service type." Matching proceeds according to the order of specificity in the child nodes. Processing proceeds in this manner, traversing downward and from left to right in FIGS. 2A and 2B, which describe a classification tree, searching the plurality of orthogonal paradigms. Key to implementing this a hierarchy is that the nodes are arranged in decreasing order of specificity. This permits search to find the most specific class for the traffic before more general.

Table 2 depicts components from which Traffic classes may be built. Note that the orientation of the server (inside or outside) is specified. And as noted above, any traffic class component may be unspecified, i.e. set to match any value.

TABLE 2

Components of a Traffic Class Specifier

| Inside (Client or Server) | Global | Outside (Server or Client) |
| --- | --- | --- |
| IP Address/Domain Name | TCP or UDP Service | IP Address/Domain Name |
| Port Number | e.g., WWW, | Port Number |
| MAC Address | FTP, RealAudio, etc. URI pattern for Web Service, MIME type for Web Service IPX Service SNA Service LAT Service IP precedence | MAC Address |

Figure 2A:
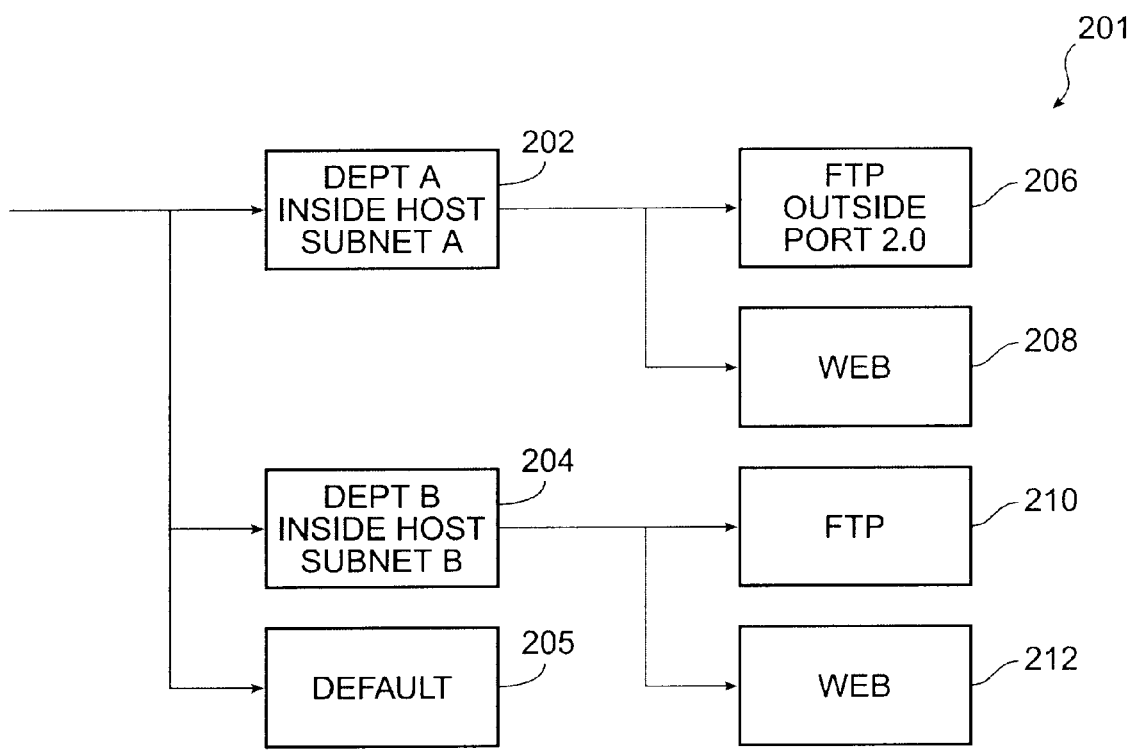
FIGS. 2A–2B depict representative divisions of bandwidth.
Figure 2B:
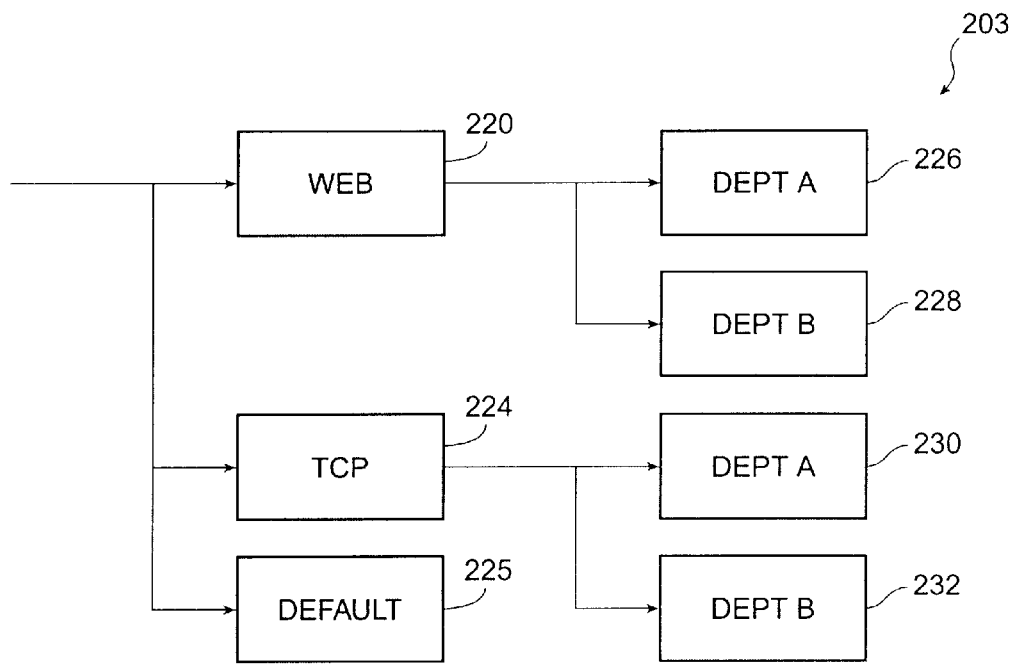

FIGS. 2A and 2B depict representative allocations of bandwidth made by a hypothetical network manager as an example. In FIG. 2A, the network manager has decided to divide her network resources first by allocating bandwidth between Departments A and B. FIG. 2A shows the resulting classification tree 201, in which Department A bandwidth resources 202 and Department B bandwidth resources 204 each have their own nodes representing a specific traffic class for that department. Each traffic class may have a policy attribute associated with it. For example, in FIG. 2A, the Department A resources node 202 has the policy attribute Inside Host Subnet A associated with it. Next, the network manager has chosen to divide the bandwidth resources of Department A among two applications. She allocates an FTP traffic class 206 and a World Wide Web server traffic class 208. Each of these nodes may have a separate policy attribute associated with them. For example, in FIG. 2A, the FTP node 206 for has an attribute Outside port 20 associated with it. Similarly, the network manager has chosen to divide network bandwidth resources of Department B into an FTP server traffic class 210 and a World Wide Web server traffic class 212. Each may have their own respective policies.

FIG. 2B shows a second example 203, wherein the network manager has chosen to first divide network bandwidth resource between web traffic and TCP traffic. She creates three traffic nodes, a web traffic node 220, a TCP traffic node 224 and a default node 225. Next, she divides the web traffic among two organizational departments by creating a Department A node 226, and a Department B node 228. Each may have its own associated policy. Similarly, she divides TCP network bandwidth into separate traffic classes by creating a Department A node 230 and a Department B node 232. Each represents a separate traffic class which may have its own policy.

All traffic which does not match any user specified traffic class falls into an automatically created default traffic class which has a default policy. In FIG. 2A, the default category is depicted by a default node 205, and in FIG. 2B, the default category is depicted by a default node 225.

3.0 Automatically Classifying Traffic 3.1 Automatic Traffic Classification

Network traffic is automatically classified under existing classes, beginning with the broadest classes, an inbound traffic class and an outbound traffic class, in protocol layer independent categories. For example, a particular instance of traffic may be classified according to its transport layer characteristics, e.g., Internet Protocol port number, as well as its application layer information, e.g., SMTP. Characteristics such as MIME types may also be automatically identified. Standard protocols, such as, IPX, SNA, and services, such as, SMTP and FTP are recognized for automatic classification. Classification is performed to the most specific level determinable. For example, in select embodiments, non-IP traffic, such as SNA, may be classified only by protocol, whereas Internet Protocol traffic may be classified to the /etc/services level. Classification beyond a terminal classification level is detected and prevented. For example, in a select embodiment, a class matching "ipx" or "nntp" will not be further automatically classified.

3.1.1 Service Aggregates

A service aggregate is provided for certain applications that use more than one connection in a particular conversation between a client and a server. For example, an FTP client in conversation with an FTP server employs a command channel and a transfer channel, which are distinct TCP sessions on two different ports. In cases where two or three TCP or UDP sessions exist for each conversation between one client and one server, it is useful to provide a common traffic class i.e., the service aggregate, containing the separate conversations. In practice, these types of conversations are between the same two hosts, but use different ports. According to the invention, a class is created with a plurality of traffic specifications, each matching various component conversations.

3.1.2 Subclassification Under Specified Criterion

Subclassification of traffic into a tree is performed by matching the hosts and then searching for particular services. Traffic specifications are aggregate kinds of traffic for a traffic class, e.g., different components of FTP may reside under class FTP. Subclassification is performed by first locating a class that matches, and then performing finer grade matchings. Processing commences with a decision on what traffic is to be subclassified. A marker is placed in the match_all default node so that when match processing reaches the marker, the autoclassification processing depicted in flowchart 403, determines that it has not found an existing class for the traffic being classified.

3.1.3 Default Suggested Policies

A default policy may be suggested or, in select embodiments, automatically applied, to a traffic class which has been automatically classified. Applying suggested or default policies for a new class at a user's option is described in a copending, commonly owned, U.S. patent application Ser. No. 09/198,051, still pending, entitled, "Method for Automatically Determining a Traffic Policy in a Packet Communications Network", which is incorporated herein by reference in its entirety for all purposes.

3.1.4 Analysis of Data in Determining Traffic Class

In a preferable embodiment, classification can extend to examination of the data contained in a flow's packets. Certain traffic may be distinguished by a signature even if it originates with a server run on a non-standard port, for example, an HTTP conversation on port 8080 would not be otherwise determinable as HTTP from the port number. Further analysis of the data is conducted in order to determine classification in instances where: 1) FTP commands are used to define server ports, 2) HTTP protocol is used for non-web purposes. The data is examined for indication of push traffic, such as pointcast, which uses HTTP as a transport mechanism. These uses may be isolated and classified into a separate class. Marimba and pointcast can be distinguished by looking into the data for a signature content header in the get request. Pointcast has URLs that begin with "/FIDO-1/." Other applications in which protocol can be inferred from data include Telnet traffic. Both tn3270 and tn3270E (emulation) may be detected by looking into data and given a different class. Telnet traffic has option negotiations which may indicate an appropriate class.

3.1.5 Identity of Traffic Based Upon Resource Creator's Class

A traffic class may be inferred from determining the identity of the creator of a resource used by the traffic class. For example, the identity of traffic using a certain connection can be determined by finding the identity of the creator of the connection. This method is used to detect Real Time Protocol (RTP) for point-to-point telephony, RTP for broadcast streaming, CCITT/ITU H320-telephony over ISDN, H323-internet telephony over the internet (bidirectional) and RTSP real time streaming protocol for movies (unidirectional).

3.1.6 Dynamic Ports

Applications having a well known port for a server may make use of dynamic ports. Some applications will send initial messages across a first connection, then negotiate a dynamic port for further conversation. During the existence of a connection, both endpoints are known. A check is made for two simultaneous connections to the same, non well-known port, at same time from different locations. This condition is indicative of a connection port for some application. Varieties of the dynamic port exist in applications. Certain dynamic ports are incorporated into a client. Others are fixed but not registered. Still others are negotiated during a protocol exchange, as for example in passive FTP.

3.2 Automatic Traffic Classification Processing

Figure 3:
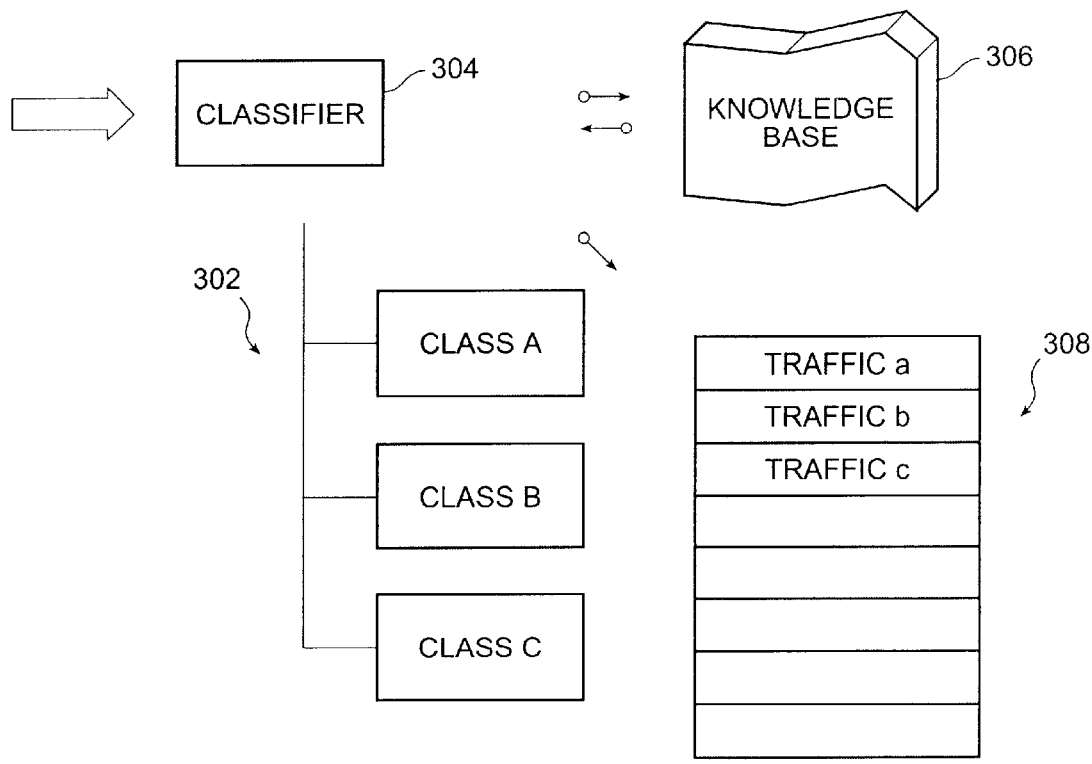
FIG. 3 depicts a component diagram of processes and data structures in accordance with a particular embodiment of the invention.

FIG. 3 depicts components of a system for automatically classifying traffic according to the invention. A traffic tree 302 in which new traffic will be classified under a particular member class node. A traffic classifier 304 detects services for incoming traffic. Alternatively, the classifier may start with a service and determine the hosts using it. A knowledge base 306 contains heuristics for determining traffic classes. The knowledge base may be embodied in a file or a relational database. In a particular embodiment, the knowledge is contained within a data structure resident in memory. A plurality of saved lists 308 stores classified traffic pending incorporation into traffic tree 302. In select embodiments, entries for each instance of traffic may be kept. In alternate embodiments, a copy of an entry and a count of duplicate copies for the entry is maintained.

Figure 4A:
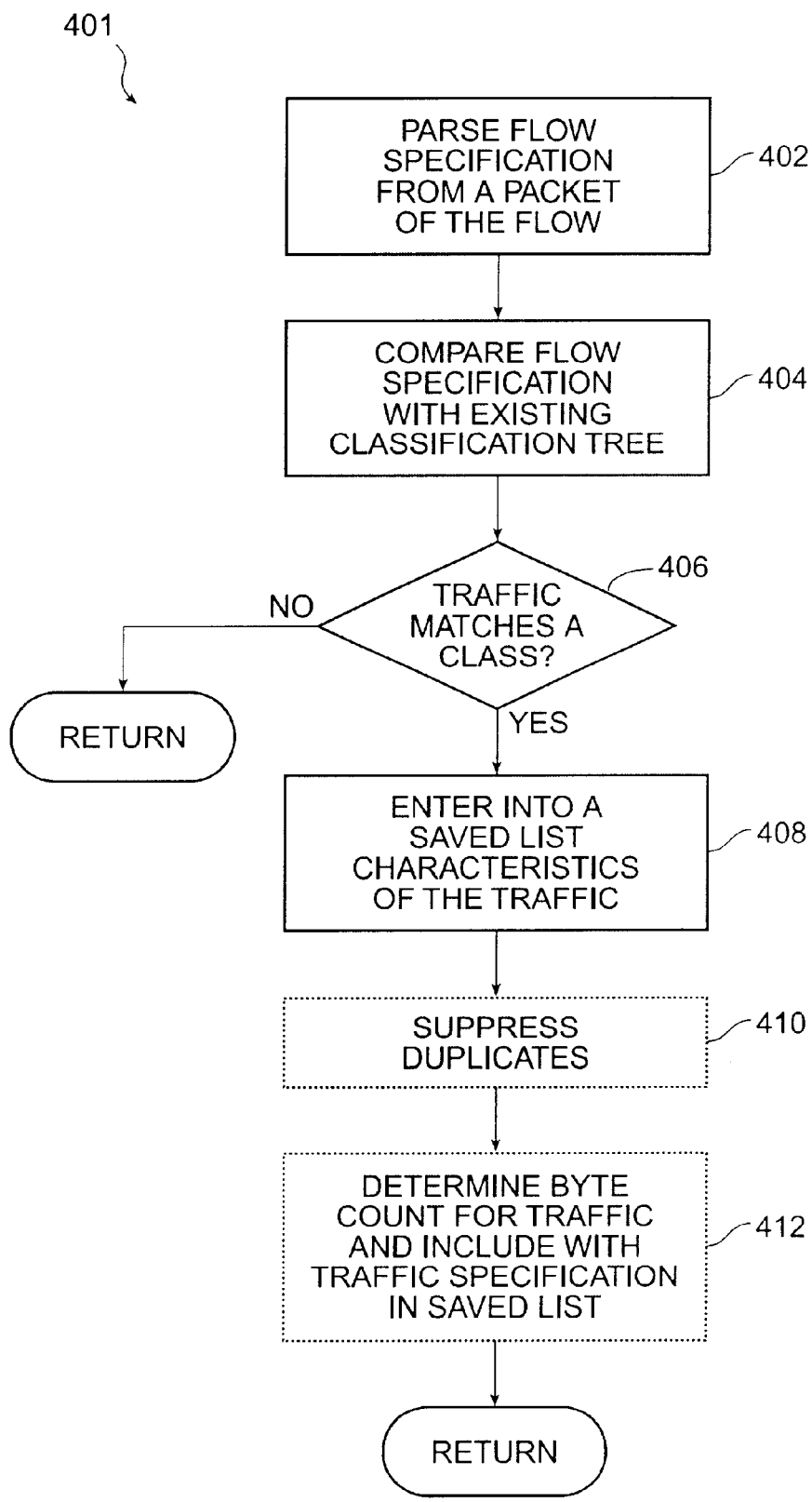
FIGS. 4A–4B depict flowcharts of process steps in automatically classifying traffic in accordance with a particular embodiment of the invention.

FIG. 4A depicts a flowchart 401 of processing steps for automatically classifying traffic. In a step 402, a flow specification is parsed from the flow being classified. Then in a step 404, the flow specification parsed from the flow in step 402 is compared with the traffic specifications in each node of the classification tree. Rules are checked starting from most specific to least specific. In a decisional step 406, a determination is made if traffic matches one of the classes being classified. If this is so, then in a step 408, an entry is made in a list of identifying characteristics, such as protocol type (SAP), IP protocol number, server port, traffic type if known, MIME type, a time of occurrence of the traffic. In an optional step 410, duplicate instances having the same identifying characteristics are suppressed, in favor of keeping a count of the duplicates and a most recent time traffic with these identifying characteristics was encountered. In an optional step 412, a byte count of traffic of this type has been detected is included. Otherwise, the automatic classification has failed to determine a class and processing returns.

In a preferable embodiment, processing according to flowchart 401 may execute on multiple instances of saved list 308.

3.2.1 Displaying Results to a User

In an optional step 413 (not show), after the processing of flowchart 401 completes or at periodic intervals or on demand, a list of traffic classes produced in steps 402 through 412 are displayed to a network manager. The list may be sorted by any well-known criteria such as: 1) most "hits" during a recent interval, 2) most recently-seen (most recent time first), 3) most data transferred (bytes/second) during some interval, or a moving average. The user may choose an interval length or display cutoff point (how many items, how recent, at least B bytes per second, or other thresholds). The Network manager may then take some action (e.g. pushing a button) to select the traffic types she wishes to add to the classification tree. The display can be hierarchical, as depicted in lines (3) below: FTP (3)

```
FTP-cmd
   FTP-data
to host1
   tcp
      FTP
         FTP-cmd
         FTP-data
         HTTP
            images
            java
            text
         port 9999
```
(3)

wherein the "port 9999" entry is an inference corresponding to an application checking for repeated or simultaneous connections made to a specific port.

In a related embodiment, a threshold for display or class creation of well-known traffic types is provided.

3.2.2 Interval Based Incorporation

In an alternative embodiment, at select intervals of time, non matching traffic is analyzed, and either 1) recognized and add to the tree, or 2) for repeated attempts to request a server connection port that is not known, upon exceeding a certain threshold, a class for the port's traffic is created and added to the classification tree.

Figure 4B:
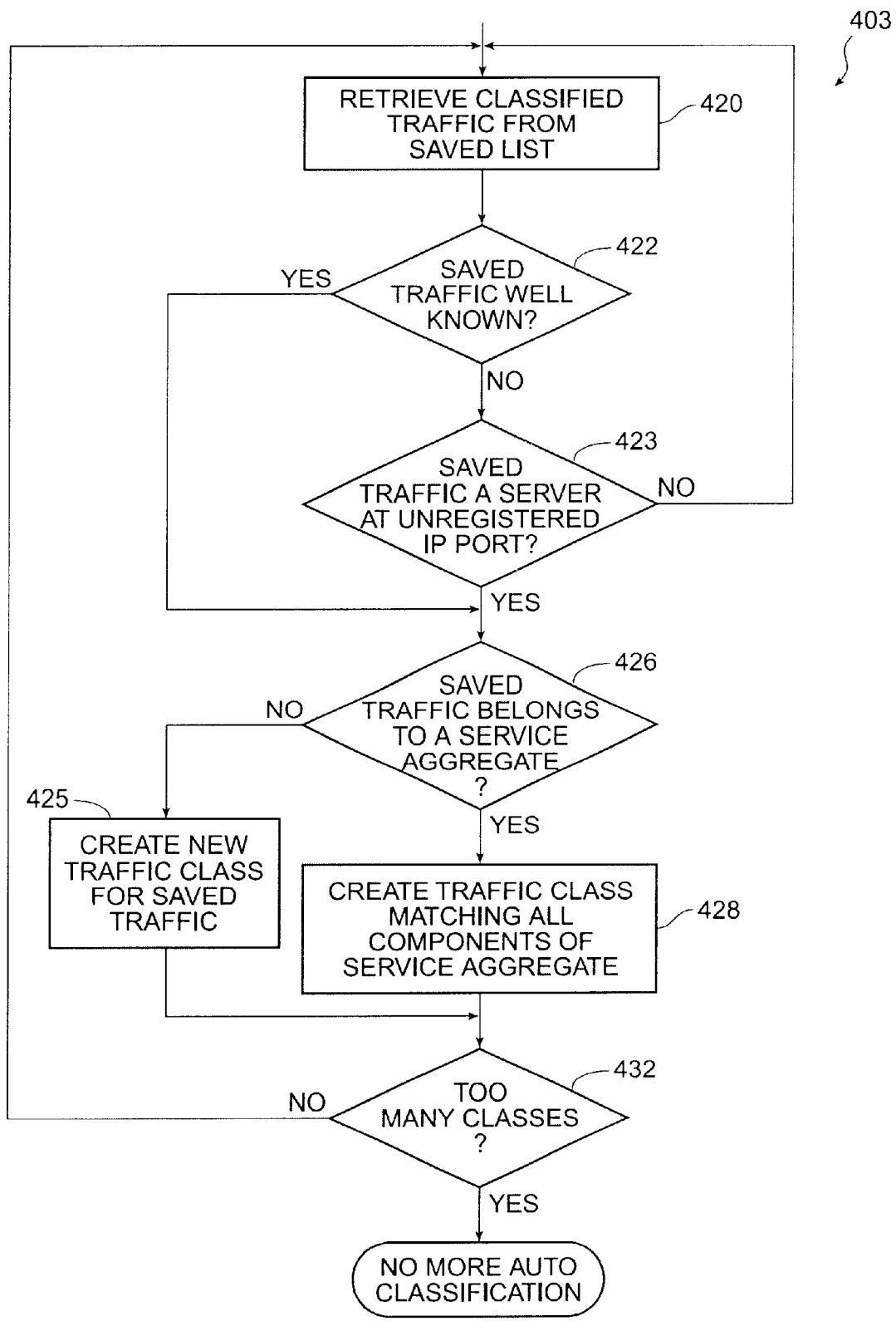

FIG. 4B depicts a flowchart 403 of the processing steps for integrating traffic classes into a classification tree in an alternative embodiment. Processing steps of flowchart 403 periodically at a defined interval of seconds, having a value of 30 in the preferable embodiment, incorporate newly classified traffic into the classification tree. In a step 420, an instance of saved traffic is retrieved from the saved traffic list 308. Next in a decisional step 422, the instance of saved traffic is examined to determine whether it is well-known (e.g. registered SAP, protocol type, assigned port number) and a name representing its type exists. If this is so then processing continues with a test of whether the saved traffic belongs to a service aggregate in step 426. Otherwise, in a step 423 the instance of saved traffic is examined to determine whether it appears to be a server connection port of an unregistered IP port (or a port that has not been configured). If this is not so then, processing continues with the next traffic class in the saved list in step 420. In decisional step 426, the instance of saved traffic is examined to determine whether it belongs to a service aggregate. For example, an FTP session has one flow that is used to exchange commands and responses and a second flow that is used to transport data files. If the traffic does belong to a service aggregate, then in a step 428, a traffic class is created which will match all components of the service aggregate. In a further step 425, a new traffic class is created to match the instance of saved traffic. The class may be flat or hierarchical.

In an optional step, a suggested policy is determined for the traffic class created in step 425. Next, in a decisional step 432, a limit is checked to verify that the number of automatically created classes has not exceeded a specified maximum.

In a related embodiment in place of step 425, a display of traffic classes, sorted by most recently used, most hits, number of bytes received during any interval, which is determined by a plurality of time stamps, is available on demand to a network manager. The network manager indicates that the traffic is to be added to the tree.

In a particular embodiment a threshold is employed to determine traffic for which a separate class should be added. A minimum usage threshold indicates whether a particular port has been used at least n times in the last s seconds. If traffic is well known, i.e., SMTP, it is added to a traffic class immediately, i.e., threshold is equal to one, otherwise, the threshold is set equal to an arbitrary value, for example, eleven uses with not more than one minute between any two uses. A new class for traffic is given a generic name, e.g., Port99 traffic. Entries for traffic over a certain maximum threshold, for example one minute old, is discarded.

In a related embodiment, another method of identifying an individual traffic class is to detect simultaneous connections to the same host port from different clients. This provides an indication that the port is a well-known connection port.

Traffic classes are created for any combination of the above mentioned categories. A flag is added to all traffic classes so created in order to indicate that it is the product of the auto classifier.

3.2 Command Language Interface:

In a particular embodiment, function of the classifier 304 is controlled by a command language interface. Table 3 depicts a plurality of command language interface commands.

TABLE 3

| | |
|---|---|
| setup autoclassify {on\|off} | To activate autoclassification for various classes to detect well-known protocols and services: |
| class auto <tclass> {inside\|outside\|both} | To turn on autoclassification under a class To detect services with the host on the inside, the outside, or both directions. |
| class auto <tclass> off | To turn off use |

The new classes have names in the format of lines (4) below:

<direction>__<service>__<parent>or <direction>__port __<number>__<parent>or <direction>__<service>__ <portnum>__<parent>

(4)

where <direction>is either "inside" or "outside" for TCP/UDP services or "auto" for others.

If a well-known service on a non-standard port (e.g. HTTP on 8080) is detected, a name in the last format will be created, assuming no previous class match.

If a heretofore unknown server-connection port appears to be "well used", an entry of the second type is created. The threshold for creation is currently 11 hits with no more than 1 minute (granularity of checking is at least 30 seconds between running successive autoclassification processes) between any two hits. For example, see lines (5) below:
inbound/inside/ftp
outside http inbound
auto__sna__inbound
inside__port__505__luna
outside__pointcast__8888__inbound
(5)
The "class show" command will now show an 'D' in the flags for classes currently being autoclassified.

3.3 Syntax of Traffic Specifications:

Flow specifications and traffic specifications have an inside service field and an outside service field. Each will have values of SVC_UNKNOWN (0), SVC_CLIENT (1), or a number greater than 1, which is the service index, an index into the global table gServiceTable. If a type of service is known for a connection, the service field at a particular side will be set to SVC_CLIENT and the service field at the opposite side will be the index into gServiceTable. If a type of service is not known for the traffic, both inside service field and outside service field will be SVC_UNKNOWN. A person of reasonable skill in the art will appreciate that other embodiments for the table, such as representing the information contained therein as text strings or by any one of a plurality of possible encoding schemes, are realizable without departing from the present invention.

Therefore, a traffic specification can have "outside service:http" (or just "outside HTTP") which is different than "outside tcp:80". The first will match HTTP on any port while the second will match anything on port 80 (including pointcast and marimba).

Specifying a traffic specification tspec "service:<agg>" returns traffic specifications for various traffic belonging to the service. Specifying "class new inbound cdls outside dls" is the same as "class new inbound cdls outside service:dls-wpn" and "class tspec add cdls outside service:dls-rpn". Most auto-recognized services will create a class that encompasses all the pieces.

Network managers need not be aware of services which are known to be derivative of others, e.g., pointcast and marimba are special cases of HTTP and tn3270 is a special case of Telnet, in order to work with the system.

4.0 Conclusion

In conclusion, the present invention provides for an automatic determination of a policy for a packet telecommunications systems wherein bandwidth is allocated to requesting flows according to automatically determined application requirements. An advantage of traffic classification techniques according to the present invention is that network managers need not know the technical aspects of each kind of traffic in order to configure traffic classes. A further advantage of the present invention is that traffic classes may include information such as a MIME type for web traffic .

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A method for automatically classifying traffic in a packet communications network, said network having any number of flows, including zero, comprising the steps of:

parsing a packet into a first flow specification, wherein said first flow specification contains at least one instance of any one of the following:

a protocol family designation, a direction of packet flow designation, a protocol type designation, a pair of hosts, a pair of ports, in HTTP protocol packets, a pointer to a MIME type; thereupon, matching the first flow specification of the parsing step to a plurality of classes represented by a plurality nodes of a classification tree type, each said classification tree type node having a traffic specification; thereupon, if a matching classification tree type node was not found in the matching step, associating said first flow specification with one or more newly-created classification tree type nodes; thereupon, incorporating said newly-created classification tree type nodes into said plurality of classification tree type nodes.

2. The method of claim 1 further comprising the steps of:

for at least a second flow having a second flow specification, recognizing said second flow specification and said first flow specification to comprise together a service aggregate; thereupon, associating said first flow specification and said second flow specification with a newly-created classification tree node, said newly-created classification tree type node having a first traffic specification corresponding to said first flow specification and a second traffic specification corresponding to said second flow specification.

3. The method of claim 1 further comprising the steps of:

applying policies from said newly-created classification tree type nodes to instances of detected traffic.

4. The method of claim 1 further comprising the steps of:

for a subclassification under a specified criterion, if a matching classification tree type node was found in the matching step, said matching classification tree type node having at least one child classification tree type node, applying the matching, associating, and incorporating steps to a particular child classification tree type node of said matching classification tree type node as a part of classification.

5. The method of claim 1 wherein the parsing step further comprises the steps of:

examining data contained within a plurality of component packets belonging to said first flow for any number of a plurality of indicators of any of the following:

a protocol;

a service; thereupon, matching said plurality of indicators to said classes represented by a plurality of said classification tree type nodes.

6. The method of claim 1 further including measuring traffic load and invoking said classification upon achievement of a minimum usage threshold.

7. The method according to claim 1 wherein said matching step is applied to hierarchically-recognized classes.

8. A system for automatically classifying traffic in a packet telecommunications network, said network having any number of flows, including zero, comprising:

a plurality of network links upon which said traffic is carried;

a network routing means; and, a processor means operative to:

parse a packet into a first flow specification, wherein said first flow specification contains at least one instance of any one of the following:

a protocol family designation, a direction of packet flow designation, a protocol type designation, a pair of hosts,
a pair of ports,
in HTTP protocol packets, a pointer to a MIME type; thereupon,
match the first flow specification of the parsing step to a plurality of classes represented by a plurality of said classification tree type nodes, each said classification tree type node having a traffic specification and a mask, according to the mask; thereupon,
if a matching classification tree type node was not found in the matching step, associating said first flow specification with one or more newly-created classification tree type nodes; thereupon, incorporating said newly-created classification tree type nodes into said plurality of said classification tree type nodes.

9. The method of claim 8 further including measuring traffic load and invoking said classification upon achievement of a minimum usage threshold.

10. The method according to claim 8 wherein said matching step is applied to hierarchically-recognized classes.

11. A method for classifying traffic in a packet telecommunications network, said network having any number of flows, including zero, comprising the steps of:
parsing a packet into a first flow specification, wherein said first flow specification contains at least one instance of any one of the following:
a protocol family designation,
a direction of packet flow designation,
a protocol type designation,
a pair of hosts,
a pair of ports,
in HTTP protocol packets, a pointer to a MIME type; thereupon,
matching the first flow specification of the parsing step to a plurality of classes represented by a plurality of classification tree type nodes, each said classification tree type node having a traffic specification; thereupon,
if a matching classification tree type node was not found in the matching step, associating said first flow specification with at least one more newly-created node; thereupon,
displaying to a network administrator a representation of traffic according to said traffic specification for use in manual intervention.

12. The method according to claim 11 further including the step of sorting said traffic representation according to most recently occurring.

13. The method according to claim 11 further including the step of sorting said traffic representation according to most data transferred for a preselected period of time.

14. The method of claim 11 further including measuring traffic load and invoking said classification upon achievement of a minimum usage threshold.

15. The method according to claim 11 wherein said matching step is applied to hierarchically-recognized classes.

* * * * *